(12) United States Patent
Driker

(10) Patent No.: US 10,077,841 B2
(45) Date of Patent: Sep. 18, 2018

(54) LINEAR ENCODER WITH IMPROVED SEALING

(71) Applicant: KappaSense Ltd., Misgav (IL)

(72) Inventor: Michael Driker, Ma'alot (IL)

(73) Assignee: KappaSense Ltd., Misgav (IL)

( * ) Notice: Subject to any disclaimer, the term of this patent is extended or adjusted under 35 U.S.C. 154(b) by 270 days.

(21) Appl. No.: 15/264,032

(22) Filed: Sep. 13, 2016

(65) Prior Publication Data

US 2018/0073637 A1    Mar. 15, 2018

(51) Int. Cl.
*G01D 5/34* (2006.01)
*F16J 15/3232* (2016.01)
*G01D 5/347* (2006.01)

(52) U.S. Cl.
CPC ...... *F16J 15/3232* (2013.01); *G01D 5/34761* (2013.01)

(58) Field of Classification Search
CPC .. G01D 5/34707; G01D 5/34738; G01D 5/24; G01D 5/34761; F16J 15/3232
USPC .......................................... 33/706
See application file for complete search history.

(56) References Cited

U.S. PATENT DOCUMENTS

| 4,982,508 | A | | 1/1991 | Nelle et al. |
| 5,485,680 | A | | 1/1996 | Nelle |
| 6,163,970 | A | * | 12/2000 | Nelle ................. G01D 5/24438 |
| | | | | 156/291 |
| 6,739,067 | B2 | | 5/2004 | Muller |
| 8,234,792 | B2 | | 8/2012 | Schenk et al. |
| 2003/0182816 | A1 | * | 10/2003 | Huber ..................... F16C 29/00 |
| | | | | 33/707 |
| 2011/0072676 | A1 | * | 3/2011 | Schenk .............. G01D 5/34769 |
| | | | | 33/707 |
| 2011/0078911 | A1 | * | 4/2011 | Driker ................ G01D 5/34707 |
| | | | | 33/1 PT |
| 2014/0284464 | A1 | * | 9/2014 | Motoyuki .......... G01D 5/34746 |
| | | | | 250/231.1 |
| 2016/0011017 | A1 | * | 1/2016 | Hayashi ............. G01D 5/34753 |
| | | | | 33/707 |

(Continued)

FOREIGN PATENT DOCUMENTS

| DE | 2328952 A1 | 1/1975 |
| DE | 3840791 C1 | 2/1990 |

(Continued)

OTHER PUBLICATIONS

Extended European Search Report, completed Dec. 9, 2016, pertaining to EP 16186783.3 filed Sep. 1, 2016.

*Primary Examiner* — Yaritza Guadalupe-McCall
(74) *Attorney, Agent, or Firm* — Dinsmore & Shohl LLP

(57) ABSTRACT

A sealed linear encoder includes a housing adapted for attachment to a first object and a scale unit and scanning unit arranged in a hollow body of the housing, which has a slot extending in a direction of measurement. The scanning unit is mounted on a first end of a pedestal slidably accommodated within the slot and whose second end is adapted for attachment to a second object. The slot is sealed by first and second pairs of sealing lips, which together with the pedestal are configured such that the pedestal intersects the first and second pairs of sealing lips at respective locations that are axially displaced along the direction of measurement such that there is no axial overlap between the first and second pairs of sealing lips at these locations.

11 Claims, 3 Drawing Sheets

(56) References Cited

U.S. PATENT DOCUMENTS

| | | | |
|---|---|---|---|
| 2017/0199060 A1* | 7/2017 | Shimoda | G01D 5/34761 |
| 2018/0073637 A1* | 3/2018 | Driker | G01D 5/34761 |
| 2018/0091017 A1* | 3/2018 | Driker | F16H 25/20 |

FOREIGN PATENT DOCUMENTS

| | | |
|---|---|---|
| DE | 102004060093 A1 | 6/2006 |
| EP | 0348660 A2 | 1/1990 |
| EP | 0348660 A3 | 8/1990 |

\* cited by examiner

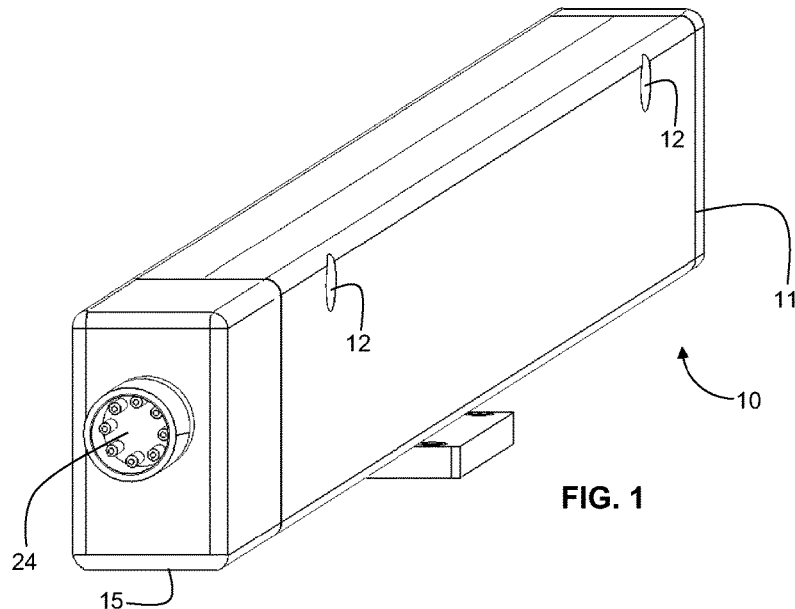
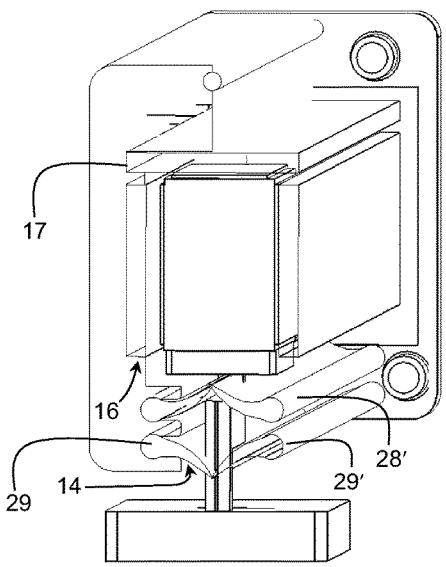
FIG. 2
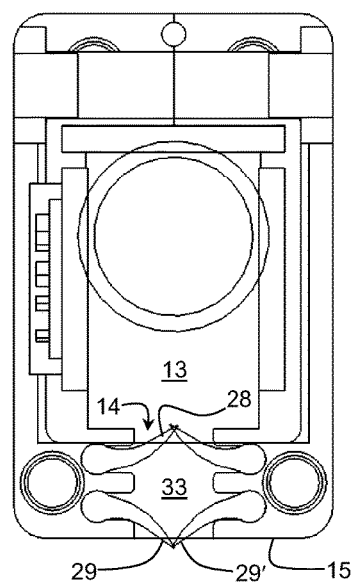
FIG. 3

LINEAR ENCODER WITH IMPROVED SEALING

FIELD OF THE INVENTION

This invention relates to linear encoders having seals for preventing or reducing contamination.

BACKGROUND OF THE INVENTION

The user of linear encoders is well known to measure linear position or linear-dependent data of production equipment or moving components thereof. Such encoders comprise reading head paired with a scale that encodes position. The reading head reads the scale in order to convert the encoded position into an electrical signal, which can then be decoded into position by a digital readout or motion controller. Frequently, linear encoders operate in dusty and contaminated environments and it is desirable to avoid contamination reaching both the reading head and the scale. To this end, it is known to mount both the reading head and the scale inside a sealed housing, which is affixed to a first object while allowing the reading head to be fixed to a second object.

U.S. Pat. No. 6,739,067 discloses a sealed linear encoder for determining the relative position of a first object and a second object. The sealed linear encoder includes a scale unit arranged in a hollow body that is mounted to a mounting structure associated with the first object and includes a slot which extends in a direction of measurement. A scanning unit for scanning the scale unit and a carrier connected to the second object, wherein the carrier extends through the slot. Sealing lips arranged at the hollow body and abutting the carrier so as to seal the carrier and a cover form-fitted to the hollow body for covering at least the slot.

U.S. Pat. No. 5,485,680 likewise discloses a sealed linear encoder having a pair of sealing lips disposed longitudinally for sealing a slot through which passes an entrainment member which connects a probing component with an object to be measured.

U.S. Pat. No. 8,234,792 discloses a linear encoder that includes a housing having an elongated hollow profile section including a first face end and a second face end, a cap disposed on the first face end and a seal which is disposed in sealing fashion between the hollow profile section and the cap. It appears from FIG. 1 of this patent that two pairs of sealing lips are disposed along the abutting edges of the slot along which a scanning unit slides relative to a scale inside the housing. Notably, the sealing lips are directed in the same direction such that their tips project toward the edge of the slot.

In all of these prior art arrangements, the housing is fixed to a first object and the scanning head is supported on a pedestal that penetrates through a slot in the housing and whose distal end projects outside of the slot and is anchored to a second object in known manner. The pedestal slides along the slot owing to relative linear movement between the first and second objects whereby the scanning head reads the scale.

A potential drawback with such an arrangement is that the sliding movement of the pedestal is apt to displace the sealing lips apart towards opposite end surfaces of the pedestal. This occurs because in locations remote from the pedestal, the edges of opposing sealing lips make abutting contact, but they obviously cannot abut one another on opposite sides of the pedestal because the pedestal displaces the sealing lips apart. Consequently, there are areas of discontinuity on opposite ends of the pedestal which prevent abutting contact of the sealing lips. These areas of discontinuity move with the pedestal and serve as conduits for the ingress of contamination.

This drawback is not significantly ameliorated, if at all, in those arrangements such as U.S. Pat. No. 8,234,792 where more than one pair of sealing lips are provided because at any given time the pedestal intersects both pairs of sealing lips in the same axial location so that the respective areas of discontinuity overlap on each end of the pedestal where the pedestal intersects the sealing lips.

SUMMARY OF THE INVENTION

It is an object of the present invention to provide a linear encoder having improved sealing.

This object is realized according to the invention by a linear encoder having the features of claim 1.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is a pictorial representation of a linear encoder;

FIG. 2 shows a partial cut-away section through the linear encoder;

FIG. 3 shows a sectional view through the linear encoder;

DETAILED DESCRIPTION OF EMBODIMENTS

Figure 4:
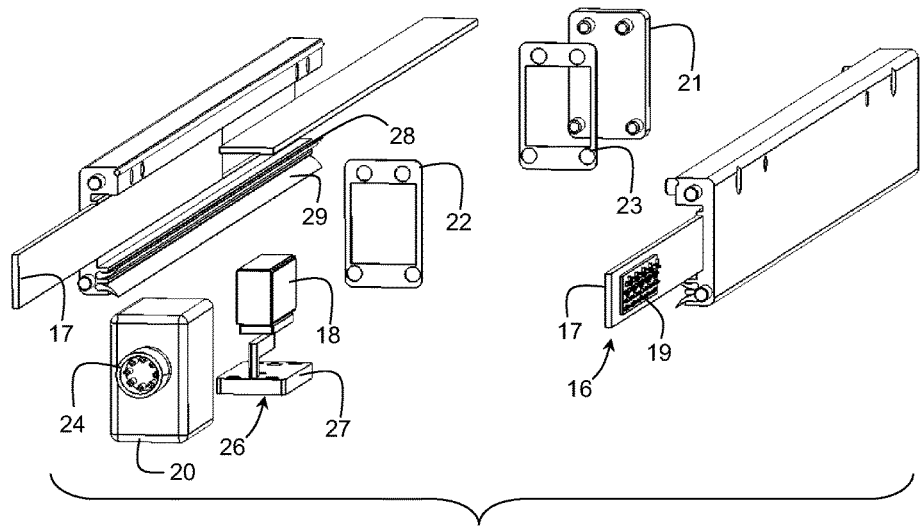
FIG. 4 is an exploded view showing components of the linear encoder.

Referring to the drawings there is shown a linear encoder 10 for determining the relative position of a first object and a second object, neither of which is shown since they are known per se and have no bearing on the invention.

The linear encoder 10 comprises a housing 11 adapted for attachment to the first object for example through apertures 12 by means of which the housing 11 may be bolted to the first object. The housing 11 includes a hollow body 13 having a slot 14 which extends in a direction of measurement through a base 15 of the housing. A scale unit shown generally as 16 is arranged in the hollow body 13 of the housing 11 and comprises multiple scales 17 each disposed on a respective side of the housing for simultaneous reading by a multi-channel reading head 18 (constituting a scanning unit) that produces signals that allow both displacement and direction of motion to be determined. The reading head 18 may be, for example, a passive read head without any wires attached. Details of the scale unit 16 and the reading head 18 are not provided since they are known per se and have no direct bearing on the present invention, which relates only to the improved sealing shortly to be described. Further details of the encoder are shown in exploded view in FIG. 4 showing two of the scales 17 in the form of circuit boards, two being omitted for the sake of clarity, on one of which is mounted an electronic circuit 19. End-plates 20 and 21 are fixed via respective sealing gaskets 22, 23 at opposite ends of the housing and a readout/power socket 24 mounted in one of the end-plates 20 is connected to the electronic circuit 19.

The reading head 18 scans the scale or scales 17 in the scale unit 16 and is mounted on a first end 25 of a pedestal 26 that is slidably accommodated within the slot 14 and whose second end 27 is adapted for attachment to the second object. First and second pairs of sealing lips 28, 28' and 29, 29', respectively are arranged for sealing opposite edges of the slot 14 and extend along the length of the slot 14 in both directions of measurement. The first and second pairs of sealing lips are displaced from one another in a direction normal to the direction of measurement. Thus, with particular reference to FIGS. 2, 3, 6 and 7 the first pair of sealing lips 28, 28' is shown uppermost relative to the base 15 while the second pair of sealing lips 29, 29' is shown below the first pair of sealing lips 28, 28' i.e. closer to the base 15. In order to simplify the following description, we will refer to the first pair of sealing lips 28, 28' as the "upper pair" and to the second pair of sealing lips 29, 29' as the "lower pair". However, it is to be understood that this is not intended to impose any specific orientation of the device. In a particularly preferred embodiment, the first, upper pair of sealing lips 28, 28' is directed upwards towards the hollow body 13, while the second, lower pair of sealing lips 29, 29' is directed downwards so as to seal the slot 14 at both ends as shown in sectional elevation in FIG. 3. This also has the effect that the tips of the respective pairs of sealing lips are maximally displaced.

Figure 5:
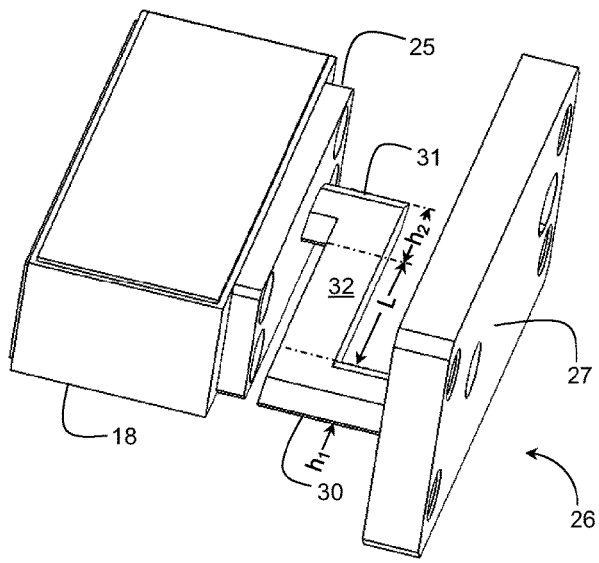
FIG. 5 shows an enlarged detail of a Z-shaped pedestal for supporting the scanning head.
Figure 6:
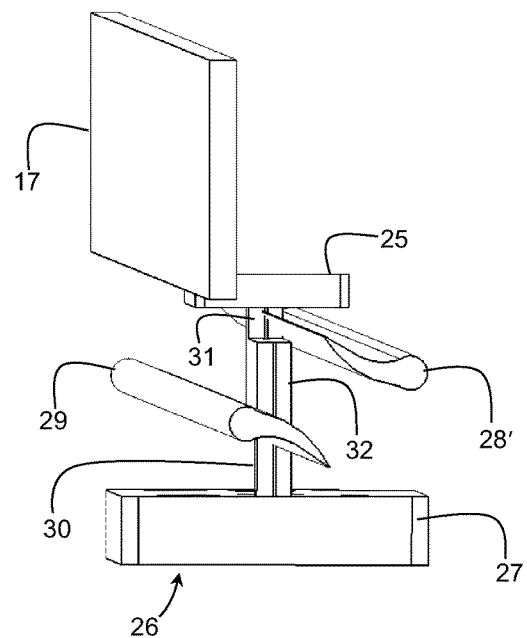
FIGS. 6 and 7 are partial cut-away sections showing the pedestal and sealing lips.
Figure 7:
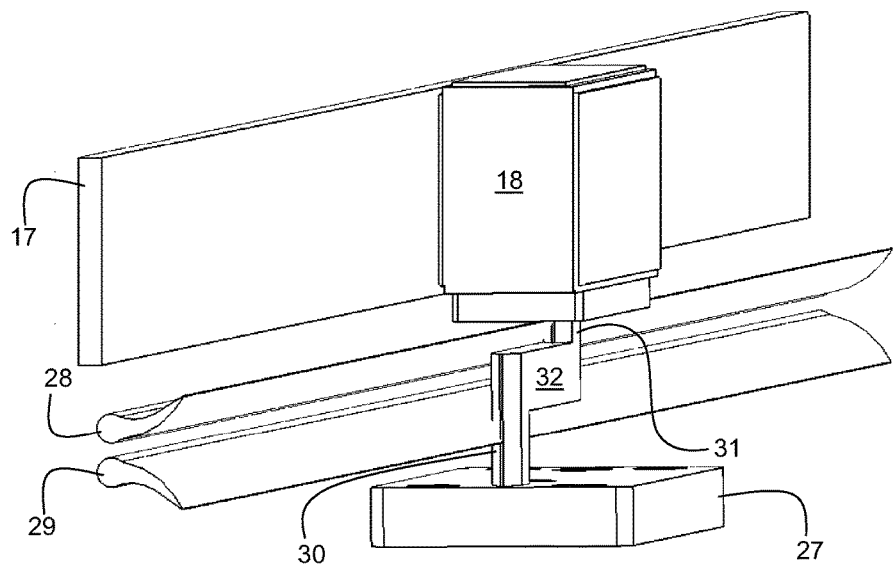

The pedestal 26 is configured such that it intersects the first and second pairs of sealing lips 28, 28' and 29, 29', respectively at respective locations that are axially displaced along the direction of measurement. To this end, the pedestal 26 may be S-shaped or Z-shaped so as to have two laterally spaced supports 30, 31 that are interconnected by a crossbar 32 such that there is no axial overlap of the two supports. Preferably but not essentially, the distance L between the two laterally spaced supports 30, 31 is equal to or greater than the lesser of their respective widths $h_1$ and $h_2$ as shown in FIG. 5. There is no mechanical contact of moving parts of the encoder apart from the sealing lips with the pedestal. Again, for the sake of clarity, we will refer to the supports 30, 31 as lower and upper supports, respectively. This is shown particularly in FIGS. 6 and 7 which are partial cut-away sections showing the pedestal and sealing lips. FIG. 6 shows that the tip of the lower sealing lip 29 abuts the lower support 30 while the tip of the upper sealing lip 28' abuts the upper support 31. The lower support 30 is anchored to a base constituting the second end 27. The crossbar 32 is fully accommodated within the diamond-shaped hollow 33 described by the four sealing lips as best seen in FIG. 7 where only one sealing lip of each pair is shown for the sake of clarity.

The tips of the respective pairs of sealing lips 28, 28' and 29, 29' are in sealing abutment apart from where they are intersected by the lower and upper supports 30 and 31, respectively. At the respective points of intersection there will inevitably be some discontinuity at the outer edges of the supports owing to distortion of the sealing lips. However, owing to the lateral displacement of the lower and upper supports 30, 31 the discontinuities in the upper and lower pairs of sealing lips are not vertically aligned and there is no overlap between the areas of intersection of the supports and the respective sealing lips. Therefore, where the discontinuity of the lower pair of sealing lips 29, 29' might allow some contamination to enter between the not quite abutting tips of the sealing lips, this contamination will be prevented from passing straight through into the hollow body 13 by the upper pair of sealing lips 28, 28' whose tips are in fully abutting engagement at the location of discontinuity in the lower pair of sealing lips 29, 29'. Conversely, the abutting engagement of the lower pair of sealing lips 29, 29' prevents any contamination entering into the diamond-shaped hollow 33 at the point of discontinuity in the upper pair of sealing lips 28, 28'.

In the preferred embodiment, the upper sealing lips 28, 28' are directed upwards towards the hollow body 13 and the lower sealing lips 29, 29' are directed downwards. This allows for a compact arrangement while still ensuring that the lower and upper sealing lips engage the lower and upper supports, respectively, of the pedestal. But this arrangement is not intended to be limiting since clearly the depth of the slot and the pedestal can be dimensioned to achieve the same effect even if both pairs of sealing lips are oriented in the same direction.

It is also to be understood that the invention is equally applicable to other types of linear encoder, such as single-channel reading heads, passive (wireless) read heads and to absolute and incremental encoders.

What is claimed is:

1. A sealed linear encoder for determining the relative position of a first object and a second object, comprising:
    a housing adapted for attachment to the first object;
    a scale unit arranged in a hollow body of the housing having a slot which extends in a direction of measurement;
    a scanning unit for scanning the scale unit and being mounted on a first end of a pedestal that is slidably accommodated within said slot and whose second end is adapted for attachment to the second object;
    a first pair of sealing lips arranged for sealing opposite edges of the slot; and
    a second pair of sealing lips arranged for sealing opposite edges of the slot, said second pair of sealing lips being displaced from the first pair of sealing lips in a direction normal to the direction of measurement;
    the pedestal and sealing lips being configured such that the pedestal intersects the first and second pairs of sealing lips at respective locations that are axially displaced along the direction of measurement whereby there is no axial overlap between the first and second pairs of sealing lips at said locations;
    wherein the pedestal comprises two laterally spaced supports of respective widths $h_1$ and $h_2$ that are interconnected by a crossbar such that each of the two supports intersects only one of the first and second pairs of sealing lips and the crossbar is fully accommodated within a hollow described by the four sealing lips.

2. The sealed linear encoder according to claim 1, wherein the first and second pairs of sealing lips are directed in mutually opposite directions.

3. The sealed linear encoder according to claim 2, wherein respective tips of the first and second pairs of sealing lips are directed away from each other.

4. The sealed linear encoder according to claim 3, wherein the pedestal has a Z-shaped armature.

5. The sealed linear encoder according to claim 4, wherein the two laterally spaced supports are spaced apart by a distance L that is equal to or greater than $h_1$ where $h_L$ is less than $h_2$.

6. The sealed linear encoder according to claim 3, wherein the pedestal has an S-shaped armature.

7. The sealed linear encoder according to claim 6, wherein the two laterally spaced supports are spaced apart by a distance L that is equal to or greater than $h_1$ where $h_L$ is less than $h_2$.

8. The sealed linear encoder according to claim 1, wherein the pedestal has a Z-shaped armature.

9. The sealed linear encoder according to claim 8, wherein the two laterally spaced supports are spaced apart by a distance L that is equal to or greater than $h_1$ where $h_L$ is less than $h_2$.

10. The sealed linear encoder according to claim 1, wherein the pedestal has an S-shaped armature.

11. The sealed linear encoder according to claim 10, wherein the two laterally spaced supports are spaced apart by a distance L that is equal to or greater than $h_1$ where $h_L$ is less than $h_2$.

* * * * *